(12) United States Patent
Davis

(10) Patent No.: US 11,651,358 B2
(45) Date of Patent: May 16, 2023

(54) METHOD AND SYSTEM FOR TRANSACTION PROCESSING WITH COMPLETE CRYPTOGRAPHIC AUDITABILITY

(71) Applicant: Mastercard International Incorporated, Purchase, NY (US)

(72) Inventor: Steven Charles Davis, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 681 days.

(21) Appl. No.: 15/658,573

(22) Filed: Jul. 25, 2017

(65) Prior Publication Data

US 2019/0034926 A1     Jan. 31, 2019

(51) Int. Cl.
    *G06Q 20/38*            (2012.01)
    *H04L 9/32*             (2006.01)
    (Continued)

(52) U.S. Cl.
    CPC ......... *G06Q 20/3825* (2013.01); *G06Q 20/02* (2013.01); *G06Q 20/223* (2013.01);
    (Continued)

(58) Field of Classification Search
    CPC .. G06Q 20/3825; G06Q 20/02; G06Q 20/223; G06Q 20/3827; G06Q 20/401; H04L 9/3239; H04L 9/3247
    See application file for complete search history.

(56) References Cited

U.S. PATENT DOCUMENTS

| | | | |
|---|---|---|---|
| 8,768,838 B1 * | 7/2014 | Hoffman | G06Q 40/00 705/72 |
| 10,026,082 B2 * | 7/2018 | Davis | G06Q 20/065 |

(Continued)

FOREIGN PATENT DOCUMENTS

| | | | | |
|---|---|---|---|---|
| CA | 2830260 A1 * | 4/2014 | ......... | G06Q 20/322 |
| CA | 2984888 A1 | 11/2016 | | |

(Continued)

OTHER PUBLICATIONS

"Block arrivals in the Bitcoin blockchain"; Bowden, R. • Keeler, H. P. • Krzesinski, A. E. • Taylor, P. G.; cited as: arXiv:1801.07447v1; (Year: 2018).*

(Continued)

*Primary Examiner* — John W Hayes
*Assistant Examiner* — Edgar R. Martinez-Hernandez
(74) *Attorney, Agent, or Firm* — Panitch Schwarze Belisario & Nadel LLP

(57) ABSTRACT

A method for processing of a cryptographically auditable transaction includes: receiving payment data, wherein the payment data includes at least a primary account number; transmitting the primary account number to a computing system; receiving a confirmation associated with the primary account number from the computing system; transmitting a payment request to the computing system, wherein the payment request includes at least a reference value associated with a payment transaction; receiving an acceptance request from the computing system, wherein the acceptance request includes at least the reference value, an acceptance address, one or more fee values, and a first digital signature generated by a third party; generating a second digital signature using at least the acceptance address; and transmitting at least the second digital signature to the computing system.

7 Claims, 9 Drawing Sheets

(51) Int. Cl.
*G06Q 20/02* (2012.01)
*G06Q 20/22* (2012.01)
*G06Q 20/40* (2012.01)
*H04L 9/00* (2022.01)

(52) U.S. Cl.
CPC ....... *G06Q 20/3827* (2013.01); *G06Q 20/401* (2013.01); *H04L 9/3239* (2013.01); *H04L 9/3247* (2013.01); *G06Q 2220/00* (2013.01); *H04L 9/50* (2022.05)

(56) References Cited

U.S. PATENT DOCUMENTS

| | | | |
|---|---|---|---|
| 10,275,767 B2* | 4/2019 | Collinge | G06Q 20/3829 |
| 10,332,107 B2* | 6/2019 | Forguson | H04L 9/0822 |
| 10,402,806 B2* | 9/2019 | George | G06Q 20/102 |
| 10,453,069 B2* | 10/2019 | Rosano | G06Q 20/085 |
| 2002/0138761 A1* | 9/2002 | Kanemaki | G06Q 20/40145 726/7 |
| 2003/0069858 A1 | 4/2003 | Kittlitz et al. | |
| 2009/0077104 A1* | 3/2009 | Sheets | G06F 21/64 |
| 2013/0185214 A1 | 7/2013 | Azen et al. | |
| 2013/0254116 A1* | 9/2013 | Hayhow | G06Q 20/3821 705/71 |
| 2015/0052064 A1* | 2/2015 | Karpenko | G06Q 20/3227 705/71 |
| 2015/0088756 A1* | 3/2015 | Makhotin | G06Q 20/32 705/71 |
| 2016/0189151 A1* | 6/2016 | He | H04L 9/3215 705/75 |
| 2016/0283941 A1* | 9/2016 | Andrade | G06Q 20/3829 |
| 2016/0335627 A1* | 11/2016 | Hugot | G06Q 20/3827 |
| 2017/0116597 A1 | 4/2017 | Bargagli et al. | |
| 2017/0132625 A1 | 5/2017 | Kennedy | |
| 2017/0148016 A1 | 5/2017 | Davis | |
| 2017/0171173 A1* | 6/2017 | Chandrasekaran | H04L 63/061 |
| 2017/0178128 A1 | 6/2017 | Fourez et al. | |
| 2017/0295023 A1* | 10/2017 | Madhavan | G06F 21/40 |
| 2017/0344963 A1* | 11/2017 | Bryars | H04M 3/2218 |
| 2017/0357970 A1* | 12/2017 | Muftic | G06Q 20/26 |
| 2018/0053160 A1* | 2/2018 | Schwartz | G06Q 20/389 |
| 2018/0053176 A1* | 2/2018 | Rawat | G06Q 20/3278 |
| 2018/0260804 A1* | 9/2018 | Mao | G06Q 20/322 |
| 2018/0315027 A1* | 11/2018 | Kumar | H04L 63/062 |
| 2019/0303917 A1* | 10/2019 | Locke | G06K 19/0724 |
| 2020/0005277 A1 | 1/2020 | Prabhu et al. | |
| 2020/0111105 A1* | 4/2020 | Gupta | G06Q 20/145 |

FOREIGN PATENT DOCUMENTS

| | | |
|---|---|---|
| CN | 104320262 A | 1/2015 |
| CN | 105745678 A | 7/2016 |
| CN | 106408299 A | 2/2017 |
| JP | 2003-514316 A | 4/2003 |
| JP | 2016-170761 A | 9/2016 |
| KR | 10-2014-0111033 A | 9/2014 |
| KR | 10-2016-0044435 A | 4/2016 |
| WO | 01/35570 A1 | 5/2001 |
| WO | 2016/179334 A1 | 11/2016 |

OTHER PUBLICATIONS

Notification of Transmittal of the International Search Report and the Written Opinion of the International Searching Authority (Forms PCT/ISA/220, PCT/ISA/210 and PCT/ISA/237) dated Sep. 17, 2018, by the European Patent Office in corresponding International Application No. PCT/US2018/035318. (10 pages).
Office Action (Notification of Reasons for Refusal) dated Mar. 2, 2021, by the Japanese Patent Office in corresponding Japanese Patent Application No. 2020-503864 and an English Translation of the Office Action. (7 pages).
Office Action (Notification of Reason for Refusal) dated May 31, 2021, by the Korean Intellectual Property Office in corresponding Korean Patent Application No. 10-2020-7004573 and an English Translation of the Office Action. (17 pages).
Written Opinion dated Aug. 12, 2021, by the Intellectual Property Office of Singapore in corresponding Singapore Patent Application No. 11202000267W. (7 pages).
Office Action (Notification of the First Office Action) dated Jun. 10, 2021, by the China National Intellectual Property Administration in corresponding Chinese Patent Application No. 201810786964.1 and an English Translation of the Office Action. (25 pages).
Office Action (Examination Report) dated Mar. 8, 2022, by the Patent Office, Government of India, in corresponding India Patent Application No. 202017002701 with an English Translation of the Office Action. (5 pages).
Office Action (Notice of Final Rejection) dated Jan. 26, 2022, by the Korean Intellectual Property Office in corresponding Korean Patent Application No. 10-2020-7004573 and an English Translation of the Office Action. (10 pages).
Office Action (Rejection Decision) dated Apr. 13, 2022, by the China National Intellectual Property Administration in corresponding Chinese Patent Application No. 201810786964.1 and an English Translation of the Office Action. (13 pages).
Notice of Allowance issued in China; Corresponding to CN201810786964.1; dated Oct. 10, 2022; (7 Pages).

* cited by examiner

US 11,651,358 B2

METHOD AND SYSTEM FOR TRANSACTION PROCESSING WITH COMPLETE CRYPTOGRAPHIC AUDITABILITY

FIELD

The present disclosure relates to the processing of electronic transactions with complete cryptographic auditability, specifically the use of a moderating system between two entities engaged in a transaction and a blockchain for complete auditability and transparency of the transaction for every involved party.

BACKGROUND

Entities engage in transactions for a variety of reasons, such as the use and/or purchase of goods or services. In many instances, an entity will keep a record of their transactions, such as for accounting purposes, or for dispute settlement between themselves and another entity. For instance, if the entity is accused of missing a payment, the entity can look at their record of transactions to find such a payment or lack thereof. However, such records often require management and upkeep by the entity themselves, or require the entity to hire a third party to maintain such records.

In addition, the management and maintenance of such records by individual entities can also result in two transacting entities having disputing records of a transaction. For instance, two parties in a transaction may each have records indicating a different amount paid between the two parties, where there may be no easy resolution for a payment dispute between the two, as each party may point to their own records for their position, but have no easy way to determine which party's record is accurate. In some cases, transacting entities may use a third party to keep records on a transaction, such as via the use of an escrow agent or other intermediary. These can be done using electronic records, such as an accounting program or programs, which often require accurate input of transaction details. Even when parts of this process are automated, such records may still be subject to tampering or inaccuracies from other sources and a transacting entity may have no ability to audit such records, particularly of each of the two or three parties involved. To do so would require accessing different computers, different, selected records perhaps kept in different formats, and designing a program complicated enough to check for a variety of irregularities and non-matching record elements.

Thus, there is a need for a technological solution whereby records may be kept for an electronic transaction between two entities that has complete cryptographic auditability to ensure auditability of the transaction by the involved entities, ensure that the transaction record is accurate as to the transaction as decided by each involved entity, and eliminate or strongly mitigate the possibility of the record being tampered with.

SUMMARY

The present disclosure provides a description of systems and methods for the processing of cryptographically auditable transactions. A transaction is agreed upon by two entities as parties thereof, where a third party is used to moderate the transaction. The transaction happening directly between the two involved parties may minimize the need to rely on a moderator, which may reduce the data exchanged in the conducting of the transaction while still maintaining the benefits of a moderator. The moderator may provide a third party acknowledgement of a transaction for further verification thereof and may, in exemplary embodiments, act as a third party facilitator of settlement between the transacting entities, enabling transactions to be conducted more easily with less resources expended by the transacting entities. The use of a blockchain to store the data related to the transactions also provides additional benefits; in particular, transaction records stored therein cannot be tampered with without immediate detection, and the immutability of the blockchain provides for complete cryptographic auditability of every transaction by involved entities. As a result, entities may engage in transactions for which cryptographic auditability is maintained, while expending less resources and achieving faster processing than available in existing systems.

A method for processing of a cryptographically auditable transaction includes: receiving, by an input device of a processing server, payment data, wherein the payment data includes at least a primary account number; electronically transmitting, by a transmitting device of the processing server, the primary account number to a computing system; receiving, by a receiving device of the processing server, a confirmation associated with the primary account number from the computing system; electronically transmitting, by the transmitting device of the processing server, a payment request to the computing system, wherein the payment request includes at least a reference value associated with a payment transaction; receiving, by the receiving device of the processing server, an acceptance request from the computing system, wherein the acceptance request includes at least the reference value, an acceptance address, one or more fee values, and a first digital signature generated by a third party; generating, by a signing module of the processing server, a second digital signature using at least the acceptance address; and electronically transmitting, by the transmitting device of the processing server, at least the second digital signature to the computing system.

Another method for processing of a cryptographically auditable transaction includes: receiving, by a receiving device of a processing server, a payment request from a first computing system, wherein the payment request includes at least a reference value associated with a payment transaction; generating, by a signing module of the processing server, a first digital signature using at least the received payment request; electronically transmitting, by a transmitting device of the processing server, at least the first digital signature and the payment request to a second computing system; receiving, by the receiving device of the processing server, a confirmation message from the second computing system, wherein the confirmation message includes at least one or more fee values, a second digital signature, and an acceptance address; electronically transmitting, by the transmitting device of the processing server, an acceptance request to the first computing system, wherein the acceptance request includes at least the reference value, the one or more fee values, the second digital signature, and the acceptance address; receiving, by the receiving device of the processing server, an acceptance message from the first computing system, wherein the acceptance message includes at least a third digital signature; and electronically transmitting, by the transmitting device of the processing server, a transaction value to a node associated with a blockchain network, wherein the transaction value includes at least the reference value, the acceptance address, and the third digital signature.

Yet another method for processing of a cryptographically auditable transaction includes: receiving, by a receiving device of a processing server, a payment request from a computing system, wherein the payment request includes at least a reference value associated with a payment transaction and a first digital signature; executing, by a querying module of the processing server, a first query to identify one or more fee values for the payment transaction and a second query to identify an acceptance address; generating, by a signing module of the processing server, a second digital signature; electronically transmitting, by a transmitting device of the processing server, at least the one or more fee values, the acceptance address, and the second digital signature to the computing system; receiving, by the receiving device of the processing server, blockchain data from a node associated with the blockchain network, wherein the blockchain data includes one or more blocks comprising a blockchain, each block being comprised of at least a block header and one or more transaction values, wherein each transaction value includes at least a transaction address, a transaction reference, and a transaction signature; executing, by the querying module of the processing server, a query on the received blockchain data to identify a specific transaction value where the included transaction address corresponds to the acceptance address; and verifying, by a verification module of the processing server, the specific transaction value based on at least a correspondence between the included transaction reference and the reference value.

A system for processing of a cryptographically auditable transaction includes: a signing module of a processing server; an input device of the processing server configured to receive payment data, wherein the payment data includes at least a primary account number; a transmitting device of the processing server configured to electronically transmit the primary account number to a computing system; and a receiving device of the processing server configured to receive a confirmation associated with the primary account number from the computing system, wherein the transmitting device of the processing server is further configured to electronically transmit a payment request to the computing system, wherein the payment request includes at least a reference value associated with a payment transaction, the receiving device of the processing server is further configured to receive an acceptance request from the computing system, wherein the acceptance request includes at least the reference value, an acceptance address, one or more fee values, and a first digital signature generated by a third party, the signing module of the processing server is configured to generate a second digital signature using at least the acceptance address, and the transmitting device of the processing server is configured to electronically transmit at least the second digital signature to the computing system.

Another system for processing of a cryptographically auditable transaction includes: a receiving device of a processing server configured to receive a payment request from a first computing system, wherein the payment request includes at least a reference value associated with a payment transaction; a signing module of the processing server configured to generate a first digital signature using at least the received payment request; and a transmitting device of the processing server configured to electronically transmit at least the first digital signature and the payment request to a second computing system, wherein the receiving device of the processing server is further configured to receive a confirmation message from the second computing system, wherein the confirmation message includes at least one or more fee values, a second digital signature, and an acceptance address, the transmitting device of the processing server is further configured to electronically transmit an acceptance request to the first computing system, wherein the acceptance request includes at least the reference value, the one or more fee values, the second digital signature, and the acceptance address, the receiving device of the processing server is further configured to receive an acceptance message from the first computing system, wherein the acceptance message includes at least a third digital signature, and the transmitting device of the processing server is further configured to electronically transmit a transaction value to a node associated with a blockchain network, wherein the transaction value includes at least the reference value, the acceptance address, and the third digital signature.

Yet another system for processing of a cryptographically auditable transaction includes: a verification module of a processing server; a receiving device of the processing server configured to receive a payment request from a computing system, wherein the payment request includes at least a reference value associated with a payment transaction and a first digital signature; a querying module of the processing server configured to execute a first query to identify one or more fee values for the payment transaction and a second query to identify an acceptance address; a signing module of the processing server configured to generate a second digital signature; and a transmitting device of the processing server configured to electronically transmit at least the one or more fee values, the acceptance address, and the second digital signature to the computing system, wherein the receiving device of the processing server is further configured to receive blockchain data from a node associated with the blockchain network, wherein the blockchain data includes one or more blocks comprising a blockchain, each block being comprised of at least a block header and one or more transaction values, wherein each transaction value includes at least a transaction address, a transaction reference, and a transaction signature, the querying module of the processing server is further configured to execute a query on the received blockchain data to identify a specific transaction value where the included transaction address corresponds to the acceptance address, and the verification module of the processing server is configured to verify the specific transaction value based on at least a correspondence between the included transaction reference and the reference value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
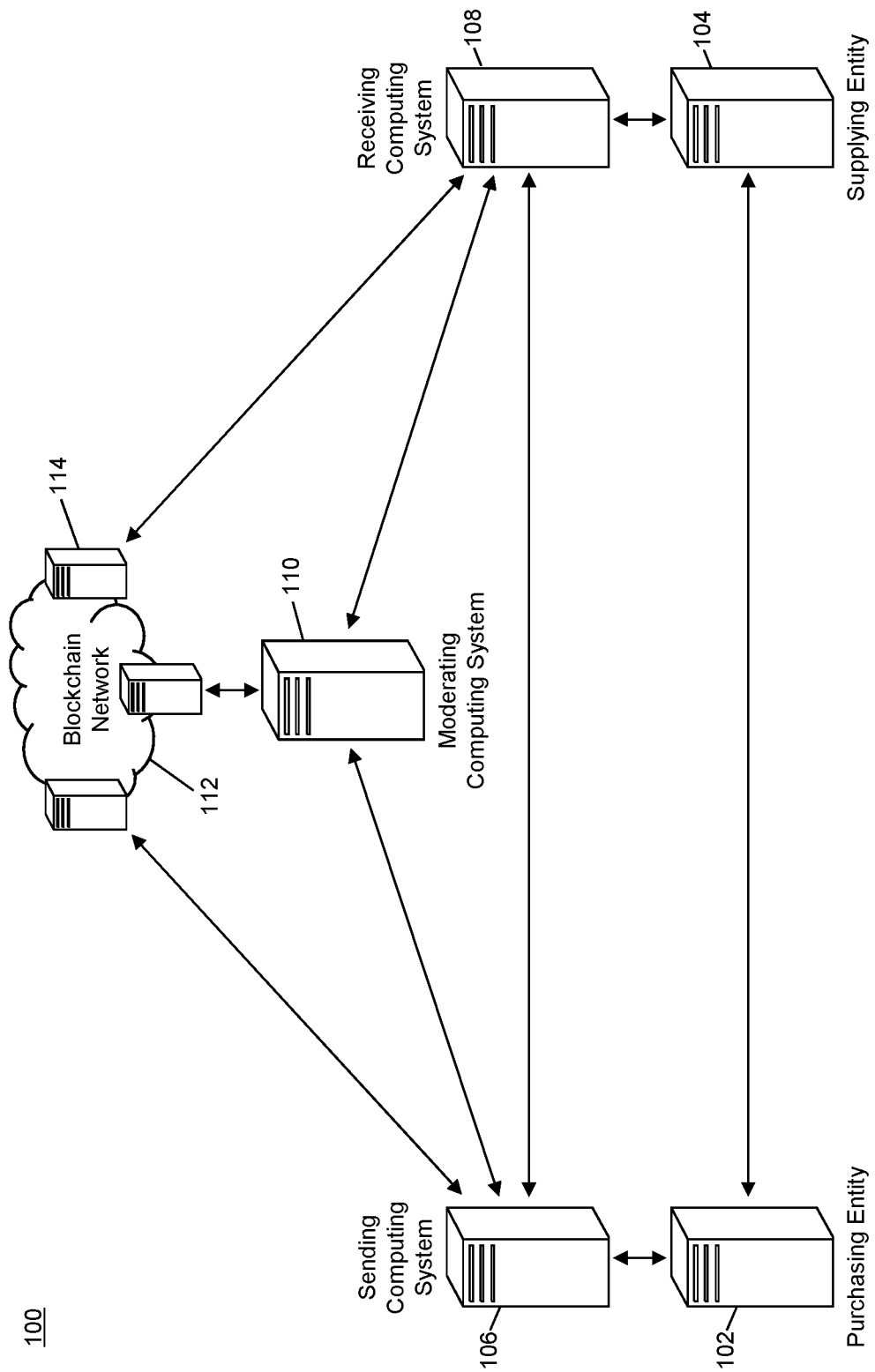
FIG. 1 is a block diagram illustrating a high level system architecture for the processing of a cryptographically auditable transaction involving the use of a moderating system and blockchain in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

System for the Processing of Cryptographically Auditable Transactions

FIG. 1 illustrates a system 100 for the processing of electronic transactions with complete cryptographic auditability between two transacting entities via the use of a moderating entity and blockchain.

The system 100 may involve an electronic transaction to be conducted between a purchasing entity 102 and a supplying entity 104. The supplying entity 104 may supply goods or services to the purchasing entity 102, for which the purchasing entity 102 makes a payment. The purchasing entity 102 may interact with a sending computing system 106 to make a payment to the supplying entity 104 in an amount agreed upon by the two entities. The sending computing system 106, discussed in more detail below, may be a computing system associated with a transaction account issued to the purchasing entity 102 that is specifically configured as discussed herein to initiate cryptographically auditable transactions. In some embodiments, the sending computing system 106 may be a part of an issuing financial institution, such as an issuing bank, that issues a transaction account to the purchasing entity 102 for use in funding electronic transactions.

The sending computing system 106 may receive payment data for use in making a payment as part of the electronic transaction involving the purchasing entity 102 and supplying entity 104. The payment data may include at least a payment amount and a primary account number associated with a transaction account (e.g., a credit, debit or other payment card number, demand deposit number, or other form of account number issued to the supplying entity 104) to which the payment is being made. In some cases, the payment data may also include an account number associated with the account issued to the purchasing entity 102, from which payment is to be debited. In some embodiments, the sending computing system 106 may receive the payment data in a transaction message that is electronically transmitted to the sending computing system 106, such as by the purchasing entity 102 or via another entity or system, such as via a point of sale device. The transaction message may be a specially formatted data message that is formatted pursuant to one or more standards governing the exchange of financial transaction messages, such as the International Organization of Standardization's ISO 8583 or ISO 20022 standards, where the payment data may be included in data elements stored therein.

Prior to initiating the process for payment to the supplying entity 104, the sending computing system 106 may contact a receiving computing system 108 to verify the eligibility of the transaction account provided thereto for payment. The receiving computing system 108, discussed in more detail below, may be a part of an acquiring financial institution, such as an acquiring bank, that issues the transaction account associated with the primary account number to the supplying entity 104 for the receipt of funds as part of the electronic transaction. The sending computing system 106 may establish a communication channel with the receiving computing system 108 using any suitable communication network and method. In some embodiments, the sending computing system 106 may possess communication data for contacting the receiving computing system 108, which may be used in establishing the communication channel. For instance, the sending computing system 106 may identify the receiving computing system 108 based on the primary account number (e.g., using an entity identification number included therein or via a lookup table) and identify communication data associated therewith.

In other embodiments, a moderating computing system 110 may be used for identification of the receiving computing system 108. The moderating computing system 110, discussed in more detail below, may be a system of a third party entity configured to act as a moderator for transactions involving the sending computing system 106 and receiving computing system 108. In such embodiments, the sending computing system 106 may provide the primary account number or data associated therewith (e.g., an entity identification number, issuer identification number, bank identification number, etc.) to the moderating computing system 110. The moderating computing system 110 may identify the receiving computing system 108 associated therewith, such as via a lookup table, and provide the sending computing system 106 with communication data for establishing the communication channel with the receiving computing system 108.

Once the communication channel is established, the sending computing system 106 may electronically transmit the primary account number supplied in the payment data to the receiving computing system 108. The receiving computing system 108 may then identify if there is a transaction account associated with that primary account number, and if the transaction account is eligible for the receipt of funds in a payment transaction. If there is no such transaction account or the transaction account is not eligible, the receiving computing system 108 may notify the sending computing system 106 accordingly, which may relay the message to the purchasing entity 102 and the transaction stopped. The purchasing entity 102 may then proceed to get a new account number from the supplying entity 104 or re-attempt the transaction using the original primary account number, such as to correct a typographical error in the account number. If the transaction account exists and is valid, the receiving computing system 108 may notify the sending computing system 106 accordingly, which may initiate the processing of the cryptographically auditable transaction.

The sending computing system 106 may first generate a payment request for the transaction. The payment request may be a request generated by the sending computing system 106 to indicate that payment, of the payment amount, is to be made to the transaction account associated with the primary account number. The payment request may include at least the payment data for the payment transaction. In one embodiment, the payment data may be formatted as a single reference value that is stored in the payment request. In such embodiments, the sending computing system 106 may generate a reference value of the payment data, such as via the application of a hashing algorithm to the payment data or use of abstract syntax notation one (ASN.1). The sending computing system 106 may then forward the payment request, including the reference value, to the receiving computing system 108 using the established communication channel. In some embodiments, the sending computing system 106 may also include a unique identifier in the payment request, which may be included in all communications between the sending computing system 106 and receiving computing system 108 associated with the transaction for identification thereof.

The receiving computing system 108 may receive the payment request and may verify the reference value included therein. Verification of the reference value may include the generation of a reference value by the receiving computing system 108 using payment data for the expected transaction (e.g., the same primary account number and payment amount as supplied by the supplying entity 104 based on the agreement with the purchasing entity 102 for the transaction), and comparison of the generated reference value to the reference value included in the payment request. If the verification fails, the receiving computing system 108 may notify the sending computing system 106 accordingly, and the transaction aborted. If the verification succeeds, then, in some embodiments, the receiving computing system 108 may provide a notification to the sending computing system 106 accordingly, which may include the reference value generated by the receiving computing system 108.

Upon successful verification of the payment request, the receiving computing system 108 may notify the moderating computing system 110 of the transaction. The notification may be comprised of the payment request as received from the sending computing system 106 and a digital signature generated by the receiving computing system 108. The digital signature may be generated via any suitable cryptographic algorithm, and may be generated via the use of a private key associated with the receiving computing system 108, which may be part of a cryptographic key pair, where the moderating computing system 110 may possess the corresponding public key. In one embodiment, the digital signature may be generated via the signing of the payment request by the receiving computing system 108 using the private key.

The moderating computing system 110 may receive the signed payment request. In some embodiments, the moderating computing system 110 may be configured to verify the digital signature on the payment request. In such embodiments, the digital signature may be verified via use of the public key that corresponds to the private key used to generate the digital signature, which may be verified using any suitable algorithm associated therewith, which may vary based on algorithm used to generate the signature, the type of public key used, and the algorithm used to generate the key pair. If the verification fails, the moderating computing system 110 may notify the receiving computing system 108 and halt the processing of the transaction.

If the verification succeeds, then the moderating computing system 110 may store the signed payment request and may identify one or more fee values for fees to be paid (e.g., by the receiving computing system 108 and/or sending computing system 106) for processing and settlement of the transaction. The moderating computing system 110 may also identify an acceptance address for the transaction. The acceptance address may be a unique value associated with the transaction, where the acceptance address may be used by each of the involved systems for identification of communications related to the transaction, which may also be used in the auditing thereof, as discussed in more detail below. The moderating computing system 110 may include the identified fee values and acceptance address in a message to be returned to the receiving computing system 108. The moderating computing system 110 may be configured to digitally sign the message, where the digital signature may be generated using a private key of a cryptographic key pair associated with the moderating computing system 110.

The receiving computing system 108 may receive the message from the moderating computing system 110, including the one or more fee values, acceptance address, and digital signature. In some embodiments, the receiving computing system 108 may verify the digital signature, such as by using a public key corresponding to the private key used by the moderating computing system 110 (e.g., received by the receiving computing system 108 as part of a registration process with the moderating computing system 110). The receiving computing system 108 may then generate an acceptance request. The acceptance request may be submitted to the sending computing system 106 via the established communication channel and include at least the reference value for the transaction, the acceptance address, the one or more fee values, and the moderating computing system's digital signature. In some instances, the receiving computing system 108 may add one or more additional fee values, such as for payment of fees to the receiving computing system 108 as part of the processing of the payment transaction.

The sending computing system 106 may receive the acceptance request and may verify the data included therein. For instance, the sending computing system 106 may verify the accuracy of the transaction reference value and verify the moderating computing system's digital signature, as discussed above. The sending computing system 106 may then determine if the acceptance request should be accepted or denied, such as based on the result of the verification and the one or more fee values. For example, the sending computing system 106 may decline the transaction due to excess fees being charged, such as may exceed a pre-established agreement between the moderating computing system 110 (e.g., during a registration process) and/or the receiving computing system 108, and/or between the purchasing entity 102 and supplying entity 104.

If the sending computing system 106 agrees to the acceptance request, the sending computing system 106 may return an indication of agreement thereof to the receiving computing system 108. The indication may include at least a digital signature generated by the sending computing system 106, such as via the use of a private key of a cryptographic key pair associated with the sending computing system 106. The digital signature may be generated on at least the transaction reference value and/or acceptance address, but may also, or alternatively, be generated on the one or more fee values to directly acknowledge agreement to pay the indicated fees. Such data may be included in a message that is digitally signed and then electronically transmitted to the receiving computing system 108 using the established communication channel.

The receiving computing system 108 may receive the signed message from the sending computing system 106, which may indicate that the sending computing system 106 agrees to make payment for the payment amount and fee value(s) to the receiving computing system 108. The receiving computing system 108 may then submit a transaction value to a blockchain network 112 for inclusion in a blockchain for confirmation of the transaction. The blockchain network 112 may be comprised of a plurality of nodes 114, where the nodes 114 are each configured to generate new blocks for addition to the blockchain that are verified by other nodes 114 using traditional methods and systems that will be apparent to persons having skill in the relevant art. In some embodiments, the sending computing system 106, receiving computing system 108, and/or moderating computing system 110 may be a node 114.

The transaction value submitted to a node 114 in the blockchain network 112 may include at least the reference value for the transaction, the acceptance address, and the sending computing system's digital signature. The transaction value may be included in a set of transaction values that are all included in a new block that is generated, verified, and added to the blockchain. The blockchain may be comprised of a plurality of blocks, where each block includes a block header and a set of transaction values. The block header may include a timestamp, a reference to a prior block, and a reference to the set of transaction values included in the respective block. In an exemplary embodiment, the reference to the prior block may refer to the block most recently added to the block prior to that respective block (e.g., identified via the timestamp included in its block header), and may be a hash value generated via the hashing of the block header in that most recently added block. The reference to the set of transaction values included in a block may similarly be generated via the hashing of the set of transaction values included in that block. In some cases, the reference may be the root of Merkle tree generated on the set of transaction values using one or more suitable hashing algorithms. The inclusion of the references in a block header may ensure immutability and cryptographic auditability of the blockchain; a modified transaction value would be immediately identified due to its resulting in an incorrect reference for that block header, which would further result in an incorrect reference in the block header of every subsequent block added to the blockchain. Furthermore, the propagation of the blockchain across a plurality of nodes further prohibits the tampering of transaction values.

Once the transaction value for the transaction has been added to the blockchain, the sending computing system 106, receiving computing system 108, and moderating computing system 110 may each be able to verify the transaction value by verification of the transaction reference value and sending computing system's digital signature to ensure authenticity and accuracy of the transaction value. Once verified, the sending computing system 106 may debit the transaction account issued to the purchasing entity 102 and used for payment, and the receiving computing system 108 may credit the transaction account issued to the supplying entity 104 and associated with the primary account number.

Following processing of the transaction, settlement may be performed between the sending computing system 106 and the receiving computing system 108. In some cases, net settlement may be performed, where the moderating computing system 110 may make an accounting of payments between all sending computing systems 106 and receiving computing systems 108 registered therewith over a period of time (e.g., daily) and may initiate settlement of net positions once the period expires, where each system may make payment to or receive payment from the moderating entity in accordance with their net positions. Methods for accounting of transactions over time and net settlement will be apparent to persons having skill in the relevant art.

In some embodiments, the moderating computing system 110 may be configured to verify its involvement in the processed transaction and inclusion thereof in settlement to be performed. In such embodiments, the moderating computing system 110 may be configured to generate a settlement acceptance. The settlement acceptance may include at least the transaction reference value, the acceptance address, and a digital signature generated by the moderating computing system 110, which may be generated on the transaction reference value and acceptance address, or may be the digital signature previously generated by the moderating computing system 110. The settlement acceptance may be submitted to a node 114 in the blockchain network 112 for addition thereto, which may then be verified by the sending computing system 106 and receiving computing system 108 for confirmation that settlement will be performed by the moderating computing system 110 (e.g., as opposed to the sending computing system 106 and receiving computing system 108 performing settlement independently, on a per-transaction basis).

The methods and systems discussed herein may enable two entities to engage in a payment transaction for which there is complete cryptographic auditability due to the use of digital signatures, the moderating computing system 110, and the blockchain. The blockchain may provide each entity with the ability to verify transactions, where such data is also immutable to serve as a permanent record of transactions between each entity. In addition, as the blockchain only includes references to transactions, the transaction data may remain anonymous such that only parties involved in any transaction may be able to verify such data, and such that no entity may be able to identify entities involved in any transaction to which they are not a party. Thus, the blockchain serves as an immutable record that provides complete cryptographic auditability to entities using the methods discussed herein, while maintaining complete privacy of transactions in which an entity is involved.

Processing Server

Figure 2:
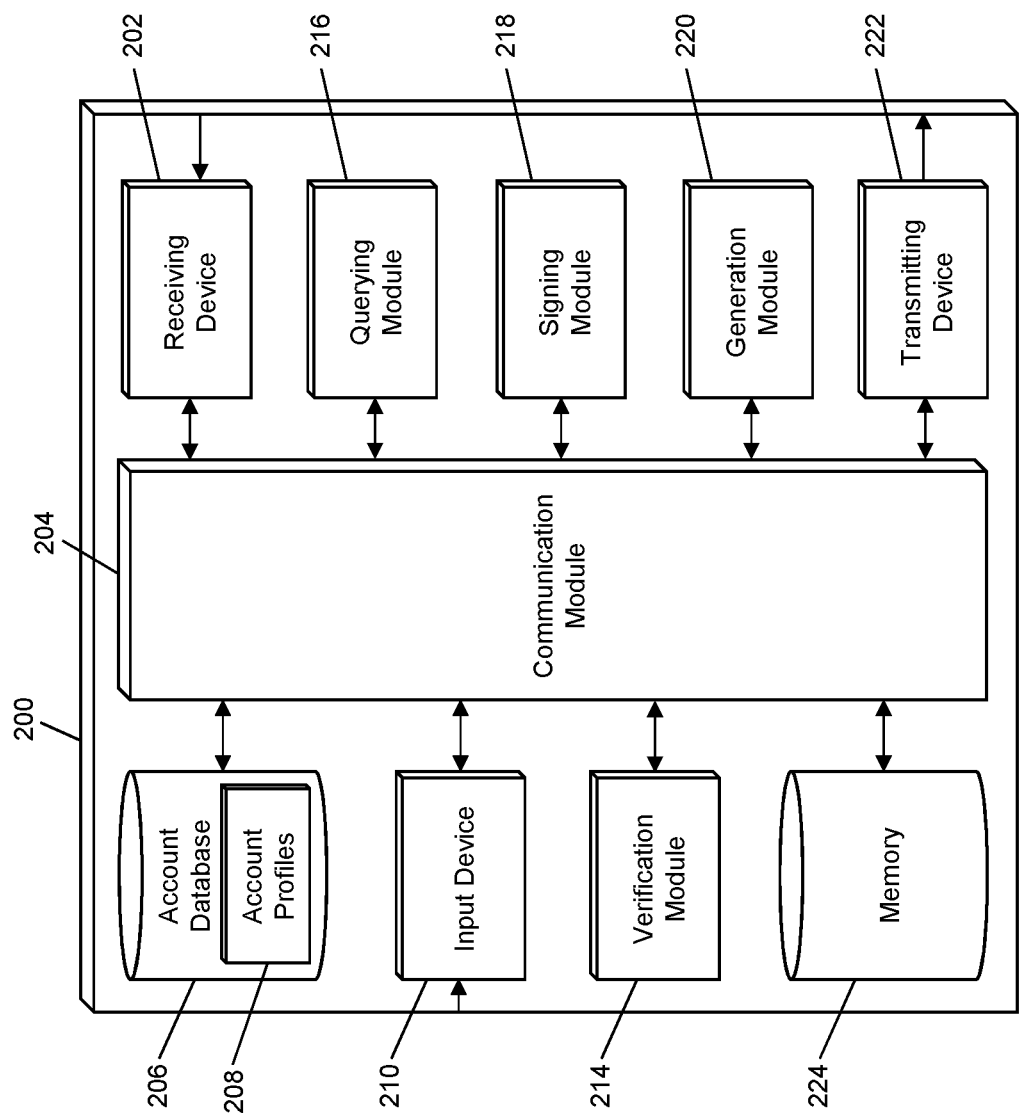
FIG. 2 is a block diagram illustrating a processing server for use in the system of FIG. 1 for the processing of cryptographically auditable transactions in accordance with exemplary embodiments.

FIG. 2 illustrates an embodiment of a processing server 200 in the system 100. It will be apparent to persons having skill in the relevant art that the embodiment of the processing server 200 illustrated in FIG. 2 is provided as illustration only and may not be exhaustive to all possible configurations of the processing server 200 suitable for performing the functions as discussed herein. For example, the computer system 800 illustrated in FIG. 8 and discussed in more detail below may be a suitable configuration of the processing server 200. The processing server 200 may be part of or may comprise the sending computing system 106, receiving computing system 108, and/or the moderating computing system 110. Accordingly, functions performed by each of the sending computing system 106, receiving computing system 108, and moderating computing system 110 may be performed by components of the processing server 200, as discussed below, where each system may include or be comprised of a processing server 200 for the performance of the functions associated therewith.

The processing server 200 may include a receiving device 202. The receiving device 202 may be configured to receive data over one or more networks via one or more network protocols. In some instances, the receiving device 202 may be configured to receive data from purchasing entities 102, supplying entities 104, sending computing systems 106, receiving computing systems 108, moderating computing systems 110, nodes 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals superimposed or otherwise encoded with payment data, which may be transaction messages formatted pursuant to one or more standards, such as the ISO 8583 or ISO 20022 standards, such as may be submitted by purchasing entities 102 and/or supplying entities 104. The receiving device 202 may also be configured to receive data signals superimposed or otherwise encoded with account verification requests and confirmations, such as may be electronically transmitted by sending computing systems 106, receiving computing systems 108, or moderating computing systems 110. The receiving device 202 may be further configured to receive data signals electronically transmitted by sending computing systems 106, which may be superimposed or otherwise encoded with payment requests and acceptance messages. The receiving device 202 may also be configured to receive data signals electronically transmitted by receiving computing systems 108, which may be superimposed or otherwise encoded with payment confirmations, payment requests, and acceptance messages. The receiving device 202 may also be configured to receive data signals electronically transmitted by moderating computing systems 110, which may be superimposed or otherwise encoded with responses to payment requests and data messages related to settlement of transactions. Receiving devices 202 may also be configured to receive data signals electronically transmitted by nodes 114, which may be superimposed or otherwise encoded with blockchain data, such as for use in verification and auditing of transactions and settlement acceptances.

The processing server 200 may also include a communication module 204. The communication module 204 may be configured to transmit data between modules, engines, databases, memories, and other components of the processing server 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 200 and external components of the processing server 200, such as externally connected databases, display devices, input devices, etc. The processing server 200 may also include a processing device. The processing device may be configured to perform the functions of the processing server 200 discussed herein as will be apparent to persons having skill in the relevant art. In some embodiments, the processing device may include and/or be comprised of a plurality of engines and/or modules specially configured to perform one or more functions of the processing device, such as a querying module 216, signing module 218, generation module 220, verification module 214, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 200 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to one or more transaction accounts, where data included therein may be based on the functions performed by the processing server 200. Account profiles 208 may include associated account numbers, balance and credit information, communication information, etc. For instance, the sending computing system 106 may store account profiles 208 for transaction account issued by the sending computing system 106, which may include balance and credit data, and may also store account profiles 208 for transaction accounts issued to receiving computing systems 108, which may include communication data for establishing communication with the associated receiving computing system 108.

The processing server 200 may also include or be otherwise interfaced with one or more input devices 210. The input devices 210 may be internal to the processing server 200 or external to the processing server 200 and connected thereto via one or more connections (e.g., wired or wireless) for the transmission of data to and/or from. The input devices 210 may be configured to receive input from a user of the processing server 200, which may be provided to another module or engine of the processing server 200 (e.g., via the communication module 204) for processing accordingly. Input devices 210 may include any type of input device suitable for receiving input for the performing of the functions discussed herein, such as a keyboard, mouse, click wheel, scroll wheel, microphone, touch screen, track pad, camera, optical imager, etc. The input device 210 may be configured to, for example, receive input of payment data, such as primary account numbers, payment amounts, fee values, other account numbers, etc., which may be used in performing the functions of the processing server 200 as discussed herein.

The processing server 200 may include a querying module 216. The querying module 216 may be configured to execute queries on databases to identify information. The querying module 216 may receive one or more data values or query strings, and may execute a query string based thereon on an indicated database, such as the account database 206, to identify information stored therein. The querying module 216 may then output the identified information to an appropriate engine or module of the processing server 200 as necessary. The querying module 216 may, for example, execute a query on the account database to identify an account profile 208 for use in verifying transaction account eligibility, identifying a receiving computing system 108, identifying communication data, etc.

The processing server 200 may also include a verification module 214. The verification module 214 may be configured to perform data verifications for the processing server 200 in conjunction with the functions discussed herein. The verification module 214 may receive instructions as input, may verify data in accordance with the instructions, and may output results of the verifications to other modules or engines of the processing server 200. In some cases, the input may include data to be used in the verifications. In other cases, the verification module 214 may be configured to identify (e.g., via instructing of the querying module 216) data to be used in the verifications. The verification module 214 may be configured to, for example, verify digital signatures, transaction reference values, fee values, settlement acceptances, and acceptance addresses during the functions of the sending computing system 106, receiving computing system 108, and moderating computing system 110 as discussed herein.

The processing server 200 may also include a signing module 218. The signing module 218 may be configured to generate digital signatures for use in performing the functions of the processing server 200 discussed herein. The signing module 218 may be configured to receive data to be signed as input, may generate a digital signature for the data using a suitable algorithm or algorithms, and may output the digital signature to other modules or engines of the processing server 200. In some embodiments, the signing module 218 may receive algorithms and/or cryptographic keys to use in the generation of digital signatures as input. In other embodiments, the signing module 218 may be configured to identify such data during the process of generating a digital signature, such as by instructing the querying module 216 to execute queries to identify data stored in the processing server 200. The signing module 218 may be configured to generate digital signatures on payment requests, acceptance requests, and other data, such as for indication of acceptance of payment amounts and fees for cryptographically auditable transactions as discussed herein.

The processing server 200 may also include a generation module 220. The generation module 220 may be configured to generate data for use in performing the functions of the processing server 200 as discussed herein. The generation module 220 may receive an instruction as input, may generate data as instructed, and may output the generated data to another module or engine of the processing server 200. For example, the generation module 220 may be configured to generate payment requests, unique identifiers, transaction reference values, acceptance requests, acceptance addresses, payment acceptances, settlement acceptances, and other data and data messages used in performing the functions of the sending computing system 106, receiving computing system 108, and moderating computing system 110 as discussed herein.

The processing server 200 may also include a transmitting device 222. The transmitting device 222 may be configured to transmit data over one or more networks via one or more network protocols. In some instances, the transmitting device 222 may be configured to transmit data to purchasing entities 102, supplying entities 104, sending computing systems 106, receiving computing systems 108, moderating computing systems 110, nodes 114, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals superimposed or otherwise encoded with account verification requests and confirmations, such as may be electronically transmitted by sending computing systems 106, receiving computing systems 108, or moderating computing systems 110. The transmitting device 222 may be further configured to electronically transmit data signals from sending computing systems 106, which may be superimposed or otherwise encoded with payment requests and acceptance messages. The transmitting device 222 may also be configured to electronically transmit data signals from receiving computing systems 108, which may be superimposed or otherwise encoded with payment confirmations, payment requests, and acceptance messages. The transmitting device 222 may also be configured to electronically transmit data signals from moderating computing systems 110, which may be superimposed or otherwise encoded with responses to payment requests and data messages related to settlement of transactions. Transmitting devices 222 may also be configured to electronically transmit data signals to nodes 114, which may be superimposed or otherwise encoded with transaction values and/or settlement acceptance messages for addition to the blockchain associated therewith.

The processing server 200 may also include a memory 224. The memory 224 may be configured to store data for use by the processing server 200 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 200 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein. The memory 224 may be configured to store, for example, blockchain data, lookup tables for receiving computing systems 108 and communication data, encryption algorithms for generating cryptographic key pairs or digital signatures, private and public keys, etc.

Process for Identification and Confirmation of a Transaction Account

Figure 3:
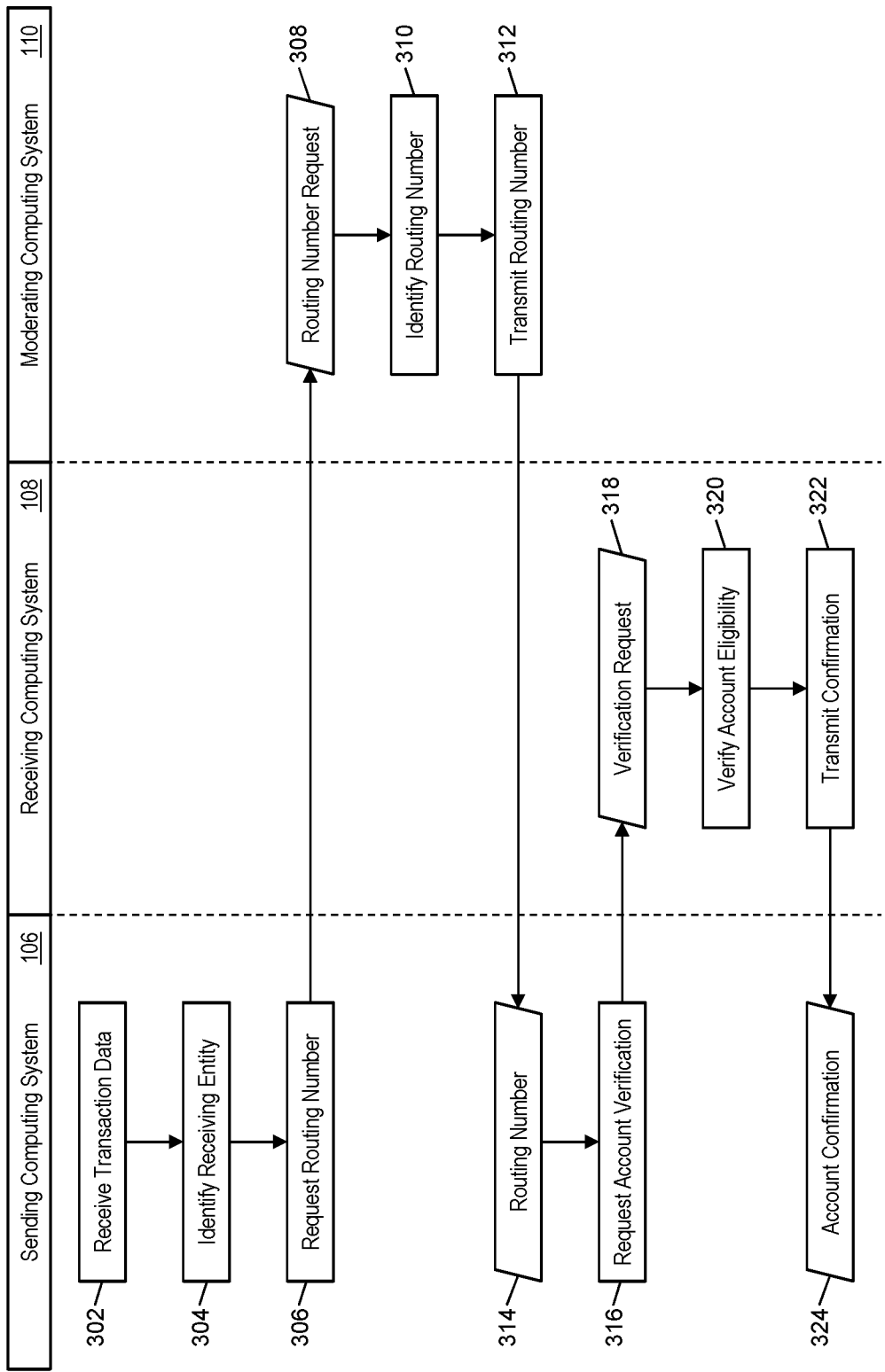
FIG. 3 is a flow diagram illustrating a process for the identification and verification of an account to be used in a cryptographically auditable transaction in the system of FIG. 1 in accordance with exemplary embodiments.

FIG. 3 illustrates a process in the system 100 for the identification of a transaction account for use in receiving funds in the cryptographically auditable transaction and confirmation of eligibility thereof.

In step 302, the receiving device 202 and/or input device 210 of the sending computing system 106 may receive payment data for a proposed transaction, where the payment data includes at least a primary account number to which payment is to be made. In step 304, the querying module 216 of the sending computing system 106 may execute a query on an account database 206 of the sending computing system 106 or other storage to identify a receiving entity associated with the primary account number. The sending computing system 106 may be able to successfully identify the entity, but may not have a current routing number associated with the receiving computing system 108 of the entity for use in establishing communication therewith.

In step 306, the transmitting device 222 of the sending computing system 106 may electronically transmit a routing number request to the moderating computing system 110. The routing number request may include the primary account number and/or identification of the receiving entity. In step 308, the receiving device 202 of the moderating computing system 110 may receive the routing number request. In step 310, the querying module 216 of the moderating computing system 110 may execute a query on an account database 206 or other storage of the moderating computing system 110 to identify a current routing number for the receiving entity. In step 312, the transmitting device 222 of the moderating computing system 110 may electronically transmit the routing number to the sending computing system 106.

In step 314, the receiving device 202 of the sending computing system 106 may receive the routing number. In step 316, the transmitting device 222 of the sending computing system 106 may electronically transmit a request for account verification to the receiving computing system 108. The request for account verification may include at least the primary account number supplied as part of the payment data, and may be submitted to the receiving computing system 108 using the routing number received from the moderating computing system 110. In some instances, the sending computing system 106 may establish a direct communication channel with the receiving computing system 108 using the routing number, through which the request for account verification may be transmitted. In step 318, the receiving device 202 of the receiving computing system 108 may receive the account verification request.

In step 320, the receiving computing system 108 may determine if the transaction account associated with the primary account number is eligible for receipt of funds via a cryptographically auditable transaction. The querying module 216 of the receiving computing system 108 may execute a query on an account database 206 stored therein and identify an account profile 208 that includes the primary account number. The verification module 214 of the receiving computing system 108 may verify that the transaction account related thereto is eligible for use in receiving funds. In step 322, the transmitting device 222 of the receiving computing system 108 may electronically transmit a confirmation message to the sending computing system 106, which may be received by a receiving device 202 thereof, in step 324. The confirmation message may indicate that the transaction account associated with the primary account number is eligible to receive funds, such that the cryptographically auditable transaction may proceed for processing.

Processing of a Cryptographically Auditable Transaction

Figure 4A:
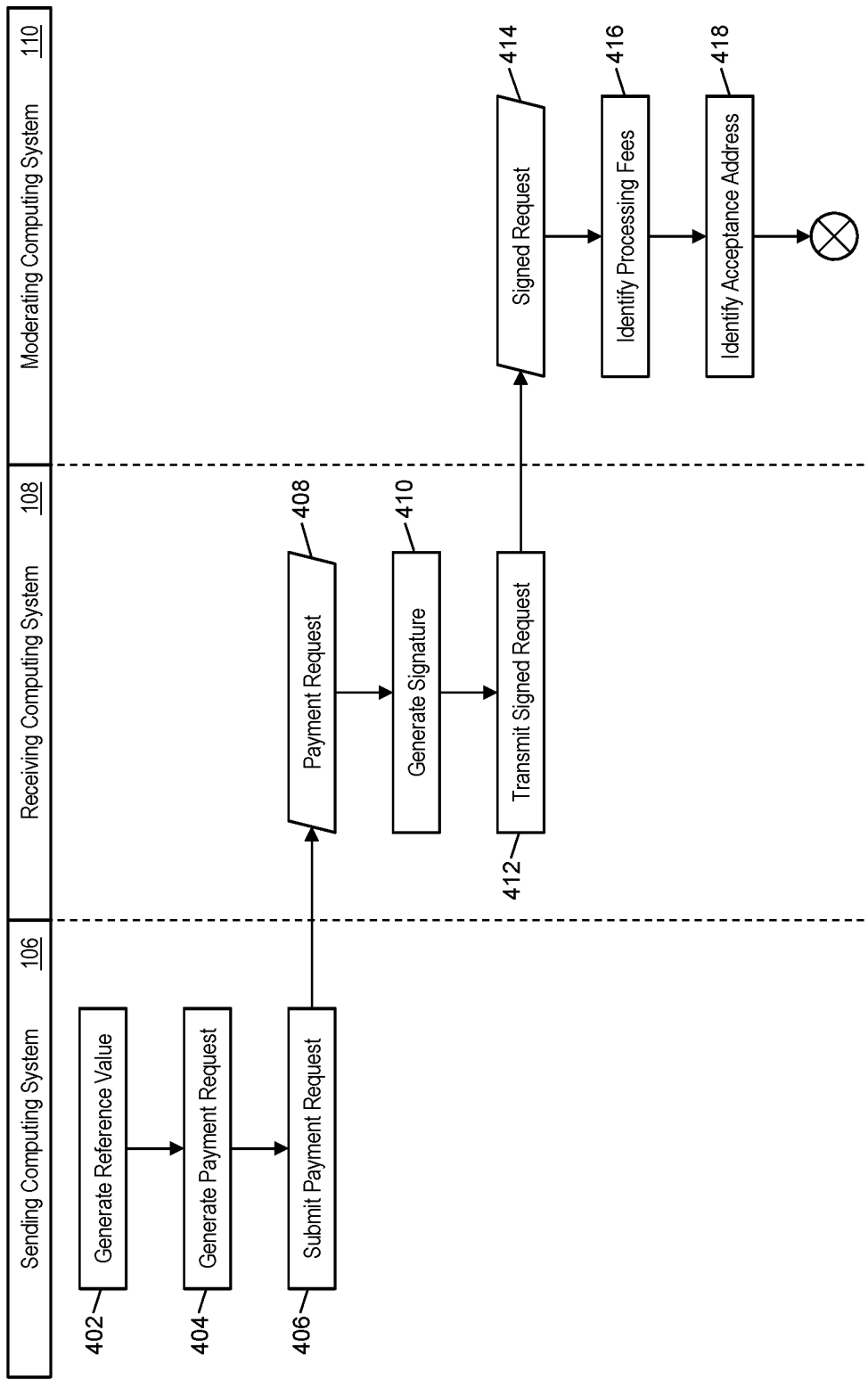
FIGS. 4A and 4B are a flow diagram illustrating a process for the processing of a cryptographically auditable transaction in the system of FIG. 1 in accordance with exemplary embodiments.
Figure 4B:
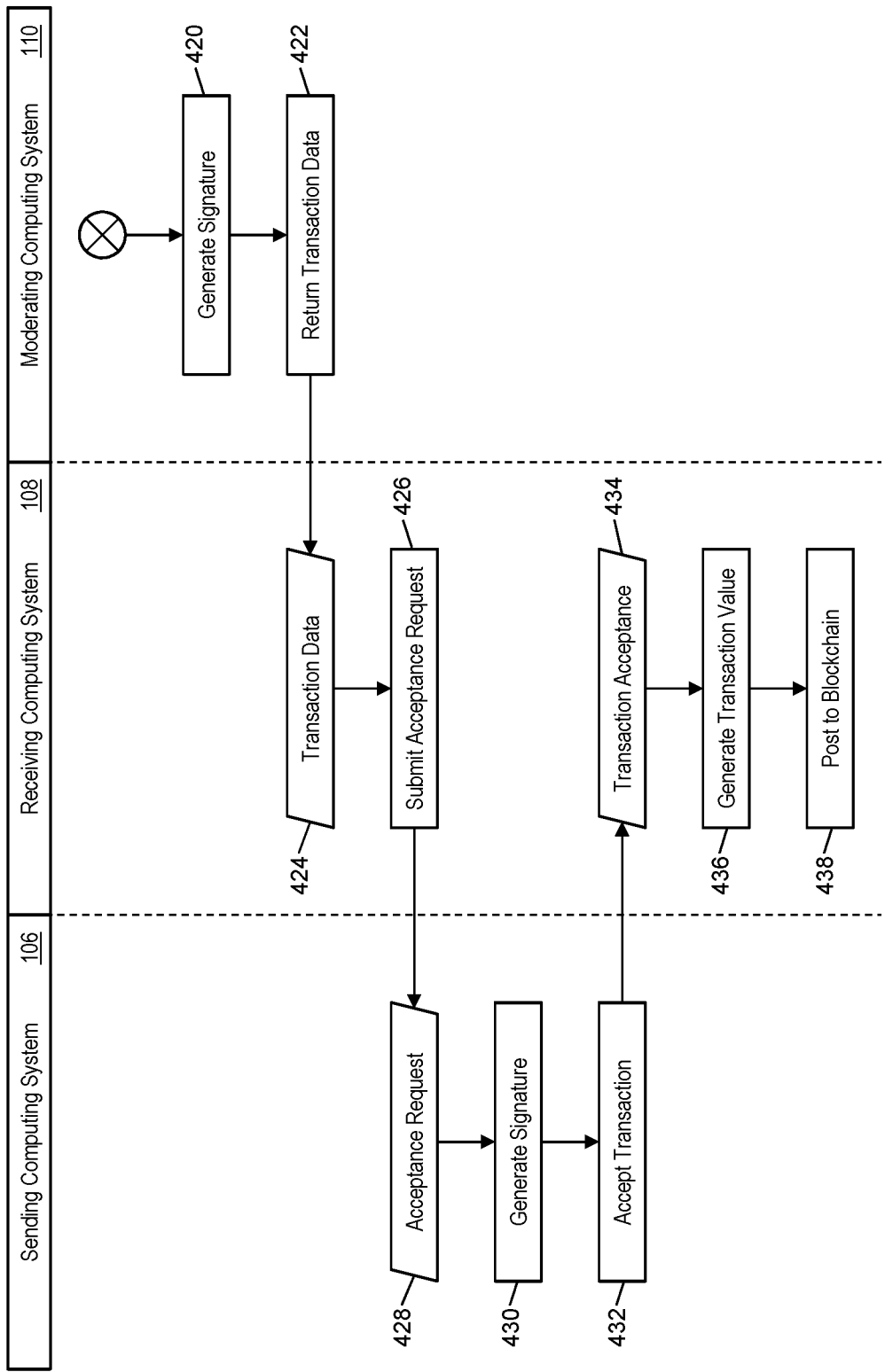

FIGS. 4A and 4B illustrate a process for the processing of a cryptographically auditable transaction involving a moderating entity and the use of a blockchain in the system 100.

In step 402, the generation module 220 of the sending computing system 106 may generate a reference value for a transaction to be processed. The reference value may be generated on payment data received for the transaction, and may be generated via the application of one or more hashing algorithms to the payment data, transformation of the payment data using standardized rules, or other suitable method. The payment data may include at least a primary account number to which payment is to be made, a payment amount, and any other data suitable for use in the processing and settlement of a transaction, such as an account number from which payment is to be made, transaction time and/or date, consumer data, product data, purchase order data, invoice data, offer data, reward data, loyalty data, geographic location, etc. In step 404, the generation module 220 of the sending computing system 106 may generate a payment request, which may include at least the generated reference value.

In step 406, the transmitting device 222 of the sending computing system 106 may electronically transmit the generated payment request to the receiving computing system 108 using a communication channel established therewith. In step 408, the receiving device 202 of the receiving computing system 108 may receive the payment request. In some embodiments, the receiving computing system 108 may be configured to acknowledge receipt of the payment request, by returning a response message to the sending computing system 106. In step 410, the signing module 218 of the receiving computing system 108 may generate a digital signature on the payment request using a private key associated with the receiving computing system 108. In step 412, the transmitting device 222 of the receiving computing system 108 may electronically transmit the signed payment request to the moderating computing system 110.

In step 414, the receiving device 202 of the moderating computing system 110 may receive the signed payment request. In some embodiments, a verification module 214 of the moderating computing system 110 may be used to verify the digital signature on the payment request, such as using a public key associated with the receiving computing system 108 and corresponding to the private key used to generate the digital signature. In step 416, the querying module 216 of the moderating computing system 110 may identify one or more fee values for processing the transaction, which may be based on the payment data for the transaction, entities involved in the transaction, or other criteria that will be apparent to persons having skill in the relevant art. In step 418, the moderating computing system 110 may identify an acceptance address for unique association with the transaction, such as may be identified via a query executed by the querying module 216 of the moderating computing system 110 or generated by the generation module 220 of the moderating computing system 110.

In step 420, the signing module 218 of the moderating computing system 110 may generate a digital signature, which may be generated on at least the identified fee values, and may be generated on a message that includes the identified fee values, acceptance address, and transaction reference value. The digital signature may be generated using a private key associated with the moderating computing system 110, such as may be queried (e.g., by the moderating computing system's querying module 216) from a memory 224 of the moderating computing system 110. In step 422, the transmitting device 222 of the moderating computing system 110 may return transaction data to the receiving computing system 108, which may be comprised of at least the identified fee values, acceptance address, and the generated digital signature.

In step 424, the receiving device 202 of the receiving computing system 108 may receive the transaction data from the moderating computing system 110. In step 426, the transmitting device 222 of the receiving computing system 108 may electronically transmit an acceptance request to the sending computing system 106. The acceptance request may include at least the transaction reference value, the one or more fee values, the acceptance address, and the moderating computing system's digital signature. In some cases, the receiving computing system 108 may verify the moderating computing system's digital signature prior to transmission of the acceptance request. In step 428, the receiving device 202 of the sending computing system 106 may receive the acceptance request. The sending computing system 106 may then (e.g., using the verification module 214 thereof) verify that the transaction should proceed, such as by confirming the data included in the acceptance request (e.g., ensuring the transaction reference value is correct, checking for excess or unknown fees, verifying the moderating computing system's digital signature, etc.).

In step 430, signing module 218 of the sending computing system 106 may generate a digital signature, which may be generated on at least the identified fee values, and may be generated on the acceptance request. The digital signature may be generated using a private key associated with the sending computing system 106, such as may be queried (e.g., by the sending computing system's querying module 216) from a memory 224 of the sending computing system 106. In step 432, the transmitting device 222 of the sending computing system 106 may electronically transmit an acceptance message to the receiving computing system 108. The acceptance message may include at least the acceptance address and the sending computing system's digital signature.

In step 434, the receiving device 202 of the receiving computing system 108 may receive the acceptance message from the sending computing system 106. In step 436, the generation module 220 of the receiving computing system 108 may generate a transaction value for the transaction. The transaction value may be formatted in compliance with any rules or standards set forth by the blockchain network 112 and may include at least the reference value for the transaction, the acceptance address, and the digital signature generated by the sending computing system 106. In step 438, the transmitting device 222 of the receiving computing system 108 may electronically transmit the transaction value to a node 114 associated with the blockchain network 112 for addition thereto using standard methods and systems. Each of the sending computing system 106, receiving computing system 108, and moderating computing system 110 may then be free to identify the transaction value in the blockchain (e.g., via the acceptance address and/or transaction reference value) and verify the data included therein. The sending computing system 106 and receiving computing system 108 may settle their respective transaction accounts accordingly, and the moderating computing system 110 may account for the transaction when performing net settlement for all associated entities.

Figure 5:
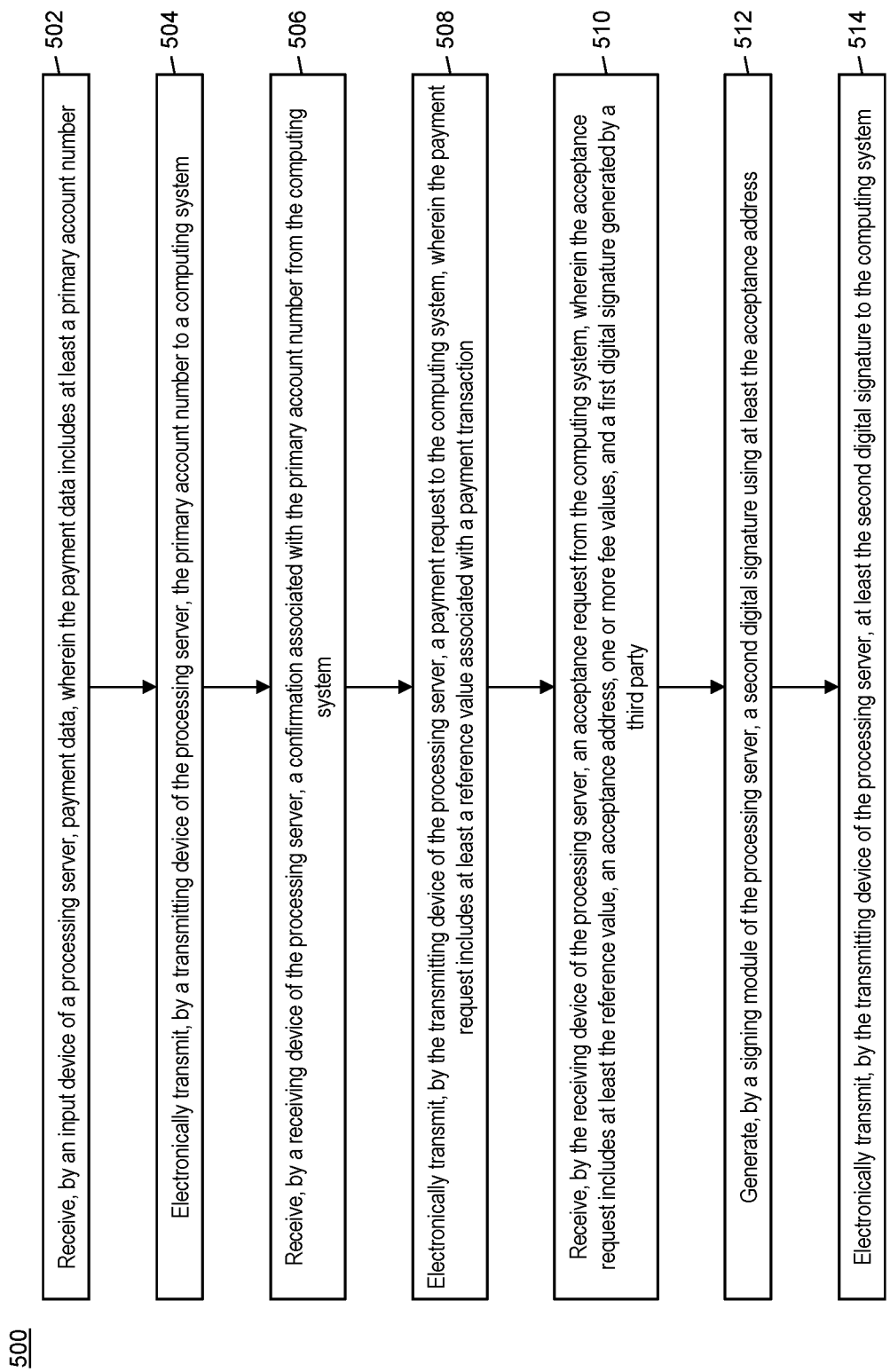
FIGS. 5-7 are flow charts illustrating exemplary methods for processing cryptographically auditable transactions in accordance with exemplary embodiments.

First Exemplary Method for Processing of a Cryptographically Auditable Transaction FIG. 5 illustrates a method 500 for the processing of a cryptographically auditable transaction including the generation and submission of a payment request from an entity associated with a transaction account used for funding of the transaction.

In step 502, payment data may be received by an input device (e.g., the input device 210) of a processing server (e.g., a processing server 200 comprising the sending computing system 106), wherein the payment data includes at least a primary account number. In step 504, the primary account number may be electronically transmitted by a transmitting device (e.g., the transmitting device 222) of the processing server to a computing system (e.g., the receiving computing system 108). In step 506, a confirmation associated with the primary account number may be received by a receiving device (e.g., the receiving device 202) of the processing server from the computing system.

In step 508, a payment request may be electronically transmitted by the transmitting device of the processing server to the computing system, wherein the payment request includes at least a reference value associated with a payment transaction. In step 510, an acceptance request may be received from the computing system by the receiving device of the processing server, wherein the acceptance request includes at least the reference value, an acceptance address, one or more fee values, and a first digital signature generated by a third party (e.g., the moderating computing system 110).

In step 512, a second signature may be generated by a signing module (e.g., the signing module 218) of the processing server using at least the acceptance address. In step 514, at least the second digital signature may be electronically transmitted to the computing system by the transmitting device of the processing server.

In one embodiment, the method 500 may further include: receiving, by the receiving device of the processing server, a transaction message associated with the payment transaction, wherein the transaction message is formatted based on one or more standards and includes at least a plurality of data elements including at least a first data element configured to store the primary account number; and generating, by a hashing module (e.g., the generation module 220) of the processing server, the reference value based on application of one or more hashing algorithms to the received transaction message. In some embodiments, the method 500 may also include receiving, by the receiving device of the processing server, blockchain data from a node (e.g., a node 114) associated with a blockchain network (e.g., the blockchain network 112), wherein the blockchain data includes one or more blocks comprising a blockchain, each block being comprised of at least a block header and one or more transaction values, wherein each transaction value includes at least a transaction address, a transaction reference, and a transaction signature; executing, by a querying module (e.g., the querying module 216) of the processing server, a query on the received blockchain data to identify a specific transaction value where the included transaction address corresponds to the acceptance address; and verifying, by a verification module (e.g., the verification module 214) of the processing server, the specific transaction value based on at least a correspondence between the included transaction reference and the reference value and a correspondence between the included transaction signature and the second digital signature.

Figure 6:
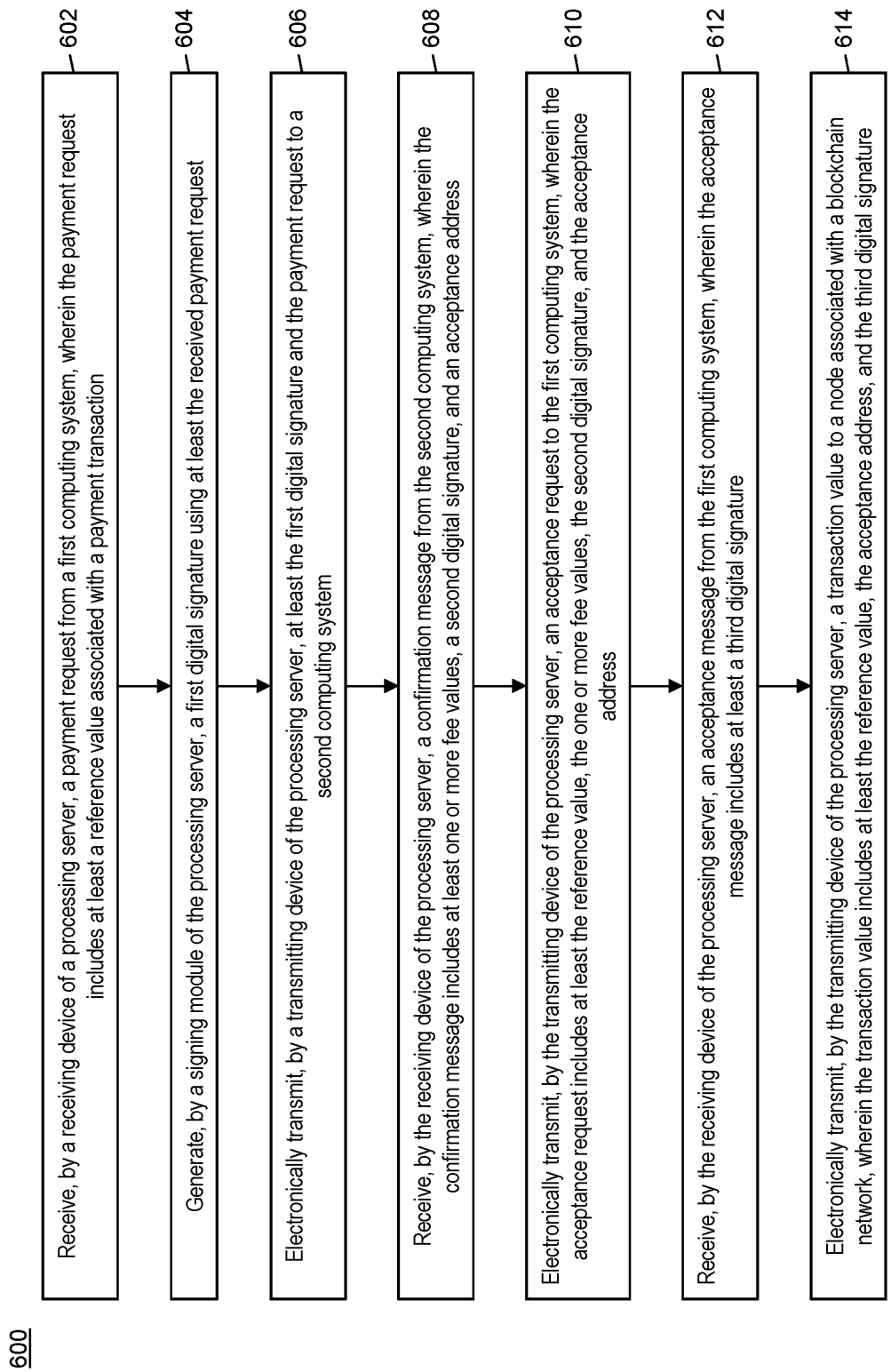

Second Exemplary Method for Processing of a Cryptographically Auditable Transaction FIG. 6 illustrates a method 600 for the processing of a cryptographically auditable transaction including the receipt and processing of a payment request by an entity associated with a transaction account used for the receipt of funds in the transaction.

In step 602, a payment request may be received by a receiving device (e.g., the receiving device 202) of a processing server (e.g., a processing server 200 comprising the receiving computing system 108) from a first computing system (e.g., the sending computing system 106) wherein the payment request includes at least a reference value associated with a payment transaction. In step 604, a first digital signature may be generated by a signing module (e.g., the signing module 218) of the processing server using at least the received payment request. In step 606, at least the first digital signature and the payment request may be electronically transmitted by a transmitting device (e.g., the transmitting device 222) of the processing server to a second computing system (e.g., the moderating computing system 110).

In step 608, a confirmation message may be received from the second computing system by the receiving device of the processing server, wherein the confirmation message includes at least one or more fee values, a second digital signature, and an acceptance address. In step 610, an acceptance request may be electronically transmitted to the first computing system by the transmitting device of the processing server, wherein the acceptance request includes at least the reference value, the one or more fee values, the second digital signature, and the acceptance address.

In step 612, an acceptance message may be received from the first computing system by the receiving device of the processing server, wherein the acceptance message includes at least a third digital signature. In step 614, a transaction value may be electronically transmitted by the transmitting device of the processing server to a node (e.g., a node 114) associated with a blockchain network (e.g., the blockchain network 112), wherein the transaction value includes at least the reference value, the acceptance address, and the third digital signature.

In one embodiment, the method 600 may further include: receiving, by the receiving device of the processing server, blockchain data from a node associated with the blockchain network, wherein the blockchain data includes one or more blocks comprising a blockchain, each block being comprised of at least a block header and one or more transaction values, wherein each transaction value includes at least a transaction address, a transaction reference, and a transaction signature; executing, by a querying module (e.g., the querying module 216) of the processing server, a query on the received blockchain data to identify a specific transaction value where the included transaction address corresponds to the acceptance address; and verifying, by a verification module (e.g., the verification module 214) of the processing server, the specific transaction value based on at least a correspondence between the included transaction reference and the reference value and a correspondence between the included transaction signature and the third digital signature. In some embodiments, the method 600 may also include: storing, in an account database (e.g., the account database 206) of the processing server, a plurality of account profiles (e.g., account profiles 208), wherein each account profile includes a structured data set related to a transaction account including at least a primary account number; receiving, by the receiving device of the processing server, a verification request from the first computing system, wherein the verification request includes at least a specific account number; verifying, by the verification module of the processing server, an account profile of the plurality of account profiles where the included primary account number corresponds to the specific account number; and electronically transmitting, by the transmitting device of the processing server, an indication of successful verification to the first computing system.

Figure 7:
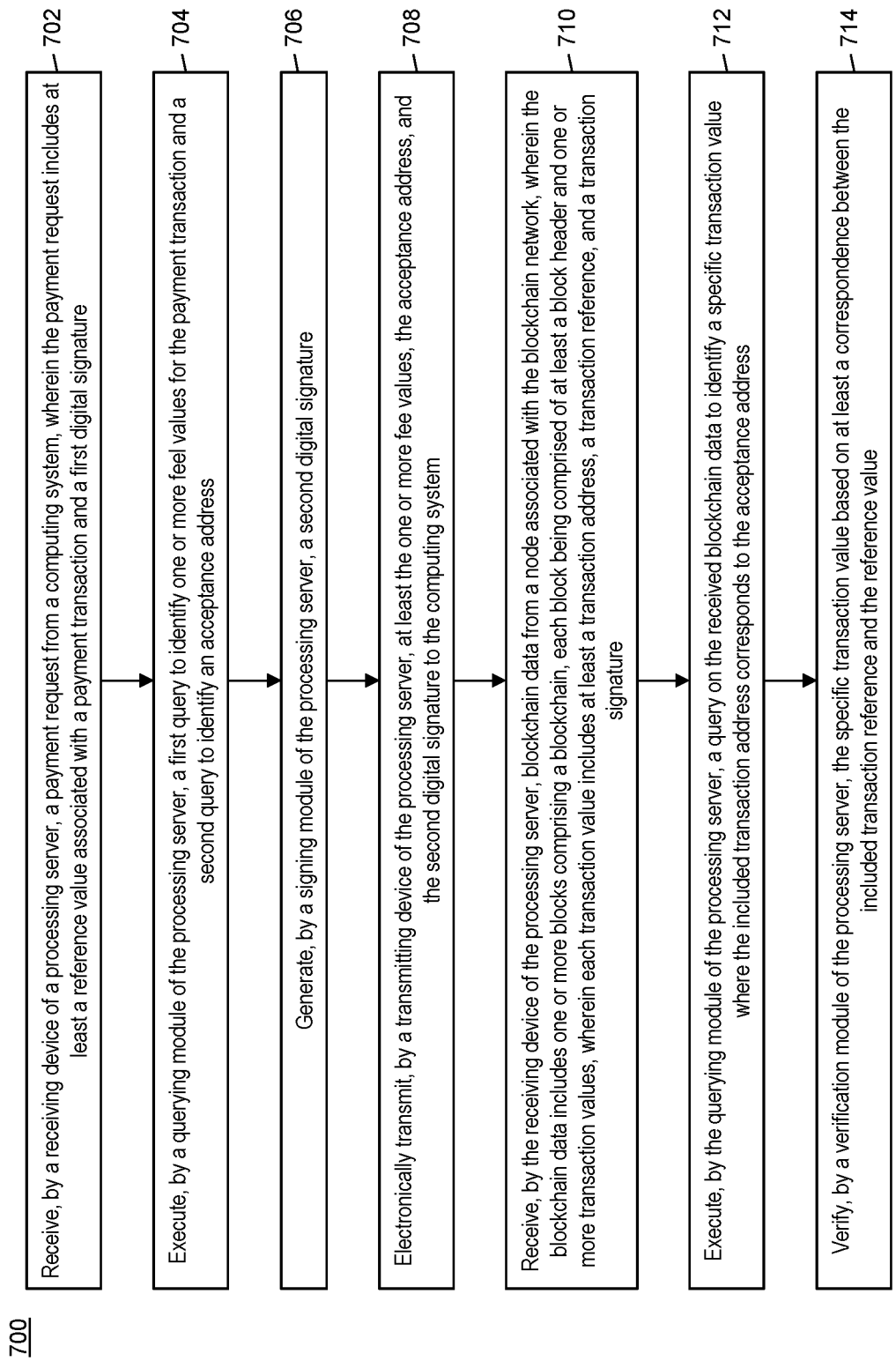

Third Exemplary Method for Processing of a Cryptographically Auditable Transaction FIG. 7 illustrates a method 700 for the processing of a cryptographically auditable transaction including the processing of data associated therewith by a third party, moderating entity.

In step 702, a payment request may be received by a receiving device (e.g., the receiving device 202) of a processing server (e.g., a processing server 200 comprising the moderating computing system 110) from a computing system (e.g., the receiving computing system 108), wherein the payment request includes at least a reference value associated with a payment transaction and a first digital signature. In step 704, a querying module (e.g., the querying module 216) of the processing server may execute a first query to identify one or more feel values for the payment transaction and a second query to identify an acceptance address. In step 706, a second digital signature may be generated by a signing module (e.g., the signing module 218) of the processing server.

In step 708, at least the one or more fee values, the acceptance address, and the second digital signature may be electronically transmitted by a transmitting device (e.g., the transmitting device 222) of the processing server to the computing system. In step 710, the receiving device of the processing server may receive blockchain data from a node (e.g., a node 114) associated with a blockchain network (e.g., the blockchain network 112), wherein the blockchain data includes one or more blocks comprising a blockchain, each block being comprised of at least a block header and one or more transaction values, wherein each transaction value includes at least a transaction address, a transaction reference, and a transaction signature.

In step 712, a query may be executed on the received blockchain data by the querying module of the processing server to identify a specific transaction value where the included transaction address corresponds to the acceptance address. In step 714, the specific transaction value may be verified by a verification module (e.g., the verification module 214) of the processing server based on at least a correspondence between the included transaction reference and the reference value. In one embodiment, the method 700 may further include: generating, by a generation module (e.g., the generation module 220) of the processing server, an acceptance entry, wherein the acceptance entry includes at least the acceptance address, the reference value, and the second digital signature; and electronically transmitting, by the transmitting device of the processing server, the generated acceptance entry to a node associated with the blockchain network.

Computer System Architecture

Figure 8:
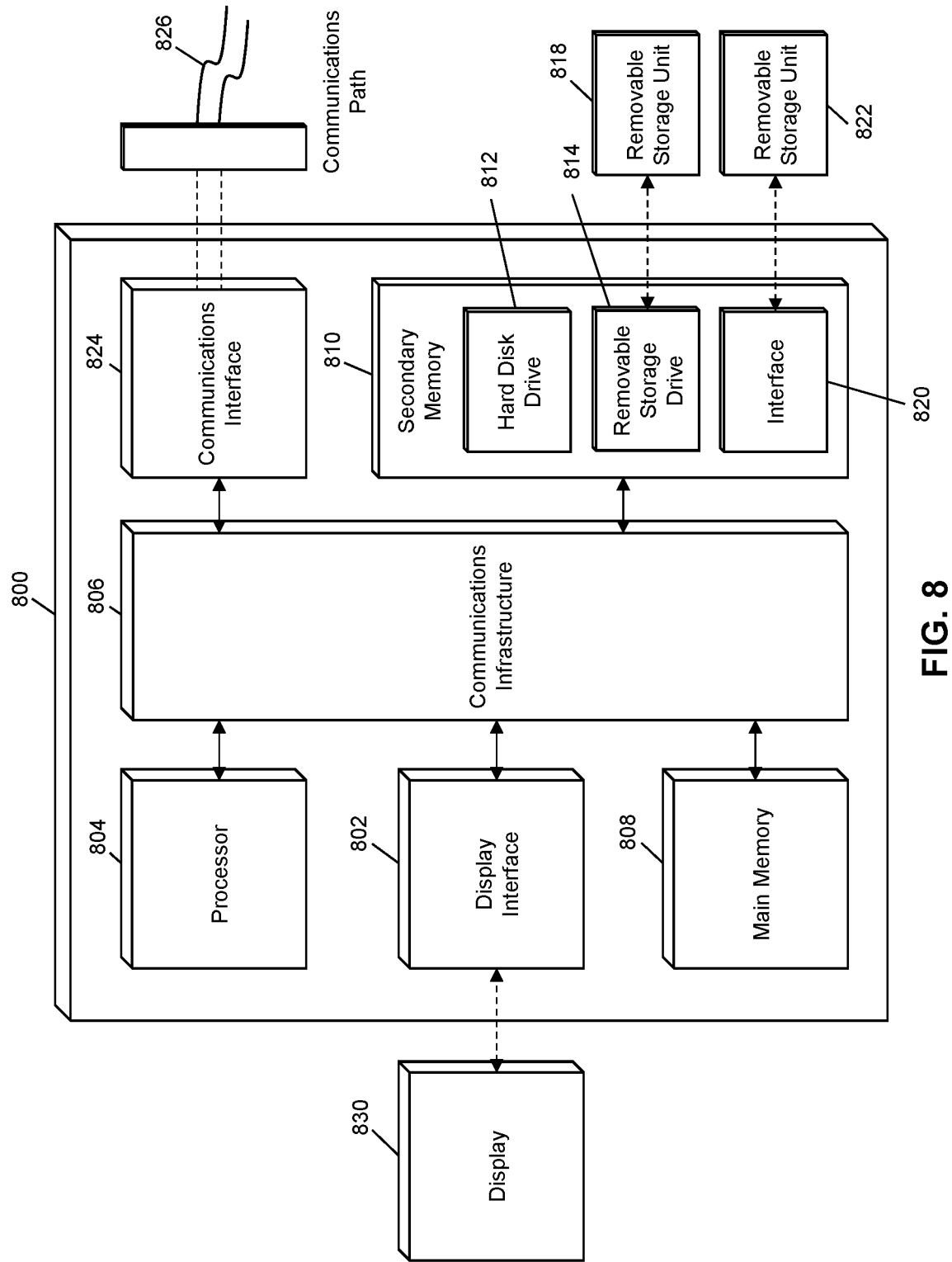
FIG. 8 is a block diagram illustrating a computer system architecture in accordance with exemplary embodiments.

FIG. 8 illustrates a computer system 800 in which embodiments of the present disclosure, or portions thereof, may be implemented as computer-readable code. For example, the sending computing system 106, receiving computing system 108, and moderating computing system 110 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 4A, 4B, and 5-7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 3, 4A, 4B, and 5-7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Techniques consistent with the present disclosure provide, among other features, systems and methods for processing cryptographically auditable transactions. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing of a cryptographically auditable transaction, comprising:
receiving, by a receiving device of a processing server, from a first computing system, at least one of a primary account number, an entity identification number, an issuer identification number, and a bank identification number;
identifying, by the processing server, a second computing system associated with the received at least one of the primary account number, the entity identification number, the issuer identification number, and the bank identification number;
transmitting, by a transmitting device of the processing server, communication data for establishing a communication channel between the first computing system and the identified second computing system;
subsequent to the first computing system and the second computing system establishing a communication channel based on the communication data, receiving, by a receiving device of a processing server, a payment request from the second computing system, wherein the payment request includes at least a reference value associated with a payment transaction and a first digital signature, wherein the reference value is a hash of a combination comprising a primary account number and a payment amount associated with the payment transaction;

executing, by a querying module of the processing server, a first query to identify one or more fee values for the payment transaction and a second query to identify an acceptance address;

generating, by a signing module of the processing server, a second digital signature;

electronically transmitting, by a transmitting device of the processing server, at least the one or more fee values, the acceptance address, and the second digital signature to the second computing system;

receiving, by the receiving device of the processing server, blockchain data from a node associated with a blockchain network, wherein the blockchain data is recorded in one or more block of a blockchain, each block being comprised of at least a block header and one or more transaction values, wherein each transaction value includes at least a transaction address, a transaction reference, and a transaction signature;

executing, by the querying module of the processing server, a query on the received blockchain data to identify a specific transaction value where the included transaction address corresponds to the acceptance address; and verifying, by a verification module of the processing server, the specific transaction value based on at least a correspondence between the included transaction reference and the reference value.

2. The method of claim 1, further comprising:

generating, by a generation module of the processing server, an acceptance entry, wherein the acceptance entry includes at least the acceptance address, the reference value, and the second digital signature; and electronically transmitting, by the transmitting device of the processing server, the generated acceptance entry to a node associated with the blockchain network.

3. A system for processing of a cryptographically auditable transaction, comprising:

a receiving device of the processing server configured to receive, from a first computing system, at least one of a primary account number, an entity identification number, an issuer identification number and a bank identification number;

a processing device of the processing server configured to identify a second computing system associated with the received at least one of the primary account number, the entity identification number, the issuer identification number, and the bank identification number;

a transmitting device of the processing server configured to transmit communication data for establishing a communication channel between the first computing system and the identified second computing system;

a querying module of the processing server;

a signing module of the processing server; and a verification module of the processing server, wherein the receiving device of the processing server is further configured to receive, subsequent to the first computing system and the second computing system establishing a communication channel based on the communication data, a payment request from the second computing system, wherein the payment request includes at least a reference value associated with a payment transaction and a first digital signature, wherein the reference value is a hash of a combination comprising a primary account number and a payment amount associated with the payment transaction, the querying module of the processing server is configured to execute a first query to identify one or more fee values for the payment transaction and a second query to identify an acceptance address, the signing module of the processing server is configured to generate a second digital signature, the transmitting device of the processing server is further configured to electronically transmit at least the one or more fee values, the acceptance address, and the second digital signature to the computing system, the receiving device of the processing server is further configured to receive blockchain data from a node associated with a blockchain network, wherein the blockchain data includes one or more blocks that form a blockchain, each block being comprised of at least a block header and one or more transaction values, wherein each transaction value includes at least a transaction address, a transaction reference, and a transaction signature, the querying module of the processing server is further configured to execute a query on the received blockchain data to identify a specific transaction value where the included transaction address corresponds to the acceptance address, and the verification module of the processing server is configured to verify the specific transaction value based on at least a correspondence between the included transaction reference and the reference value.

4. The system of claim 3, further comprising:

a generation module of the processing server configured to generate an acceptance entry, wherein the acceptance entry includes at least the acceptance address, the reference value, and the second digital signature, wherein the transmitting device of the processing server is further configured to electronically transmit the generated acceptance entry to a node associated with the blockchain network.

5. The method of claim 1, further comprising:

receiving, by the receiving device of the processing server, a routing number request from a computer system, wherein the routing number request includes the primary account number and/or identification of the receiving entity;

executing, by the querying module of the processing server, a query on an account database to identify a current routing number for the receiving entity; and transmitting, by the transmitting device of the processing server, the routing number to the computing system.

6. The system of claim 3, wherein:

the receiving device of the processing server is configured to receive a routing number request from a computer system, wherein the routing number request includes the primary account number and/or identification of the receiving entity;

the querying module of the processing server is configured to execute, a query on an account database to identify a current routing number for the receiving entity; and the transmitting device of the processing server is configured to transmit the routing number to the computing system.

7. The method of claim 1, wherein the hash is based on a combination of the primary account number, the payment amount, a transaction time, product data, and a geographic location.

\* \* \* \* \*